US011785535B2

(12) United States Patent
Wang et al.

(10) Patent No.: US 11,785,535 B2
(45) Date of Patent: Oct. 10, 2023

(54) METHOD AND APPARATUS FOR SERVICE DISCOVERY

(71) Applicant: Telefonaktiebolaget LM Ericsson (publ), Stockholm (SE)

(72) Inventors: Cheng Wang, Shanghai (CN); Peng Li, Shanghai (CN); Xinyu Zhang, Shanghai (CN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 380 days.

(21) Appl. No.: 17/269,467

(22) PCT Filed: Jul. 12, 2019

(86) PCT No.: PCT/CN2019/095740
§ 371 (c)(1),
(2) Date: Feb. 18, 2021

(87) PCT Pub. No.: WO2020/038151
PCT Pub. Date: Feb. 27, 2020

(65) Prior Publication Data
US 2021/0258861 A1    Aug. 19, 2021

(30) Foreign Application Priority Data

Aug. 20, 2018  (WO) ................ PCT/CN2018/101380

(51) Int. Cl.
*H04W 48/14* (2009.01)
*H04L 12/18* (2006.01)
(Continued)

(52) U.S. Cl.
CPC ......... *H04W 48/14* (2013.01); *H04L 12/1886* (2013.01); *H04L 45/02* (2013.01); *H04W 48/10* (2013.01)

(58) Field of Classification Search
None
See application file for complete search history.

(56) References Cited

U.S. PATENT DOCUMENTS 11,388,656 B2 *   7/2022  Baek ..................... H04W 48/16
2017/0303259 A1 *  10/2017  Lee ....................... H04W 28/16
(Continued)

FOREIGN PATENT DOCUMENTS

CN         108401275 A       8/2018

OTHER PUBLICATIONS

International Search Report and Written Opinion dated Sep. 27, 2019 in International Application No. PCT/CN2019/095740 (9 pages total).
(Continued)

*Primary Examiner* — Hong S Cho
(74) *Attorney, Agent, or Firm* — Christopher & Weisberg, P.A.

(57) ABSTRACT

Embodiments of the present disclosure provide methods, apparatus and computer program products for service discovery. A method implemented at a primary Network-Function Repository Function, NRF, in a communication network, wherein the communication network comprising at least one primary NRF and at least one secondary NRFs, the method comprising: receiving a discovery request from a first secondary NRF, wherein the discovery request comprises a service query information for a target Network Function, NF, obtaining target NF information, providing the target NF information to the first secondary NRF.

18 Claims, 7 Drawing Sheets

(51) Int. Cl.
*H04L 45/02* (2022.01)
*H04W 48/10* (2009.01)

(56) References Cited

U.S. PATENT DOCUMENTS

| 2018/0139107 A1 | 5/2018 | Senarath et al. |
| 2018/0192390 A1 | 7/2018 | Li et al. |
| 2018/0227871 A1 | 8/2018 | Singh et al. |
| 2018/0227873 A1 | 8/2018 | Vrzic et al. |

OTHER PUBLICATIONS

3GPP TS 29.510 V15.0.0, Jun. 2018, 3rd Generation Partnership Project; Technical Specification Group Core Network and Terminals; 5G System; Network Function Repository Services; Stage 3 (Release 15) (64 pages total).

3GPP TS 23.501 V15.2.0, Jun. 2018, 3rd Generation Partnership Project; Technical Specification Group Services and System Aspects; System Architecture for the 5G System; Stage 2 (Release 15) (217 pages total).

3GPP TS 23.502 V15.2.0, Jun. 2018, 3rd Generation Partnership Project; Technical Specification Group Services and System Aspects; Procedures for the 5G System; Stage 2 (Release 15) (308 pages total).

EPO Communication with Supplementary European Search Report dated Apr. 21, 2022 for Patent Application No. 19852595.8, consisting of 8-pages.

SA WG2 Meeting #122Bis, Temporary document S2-175508; Title: 23.502 on NF service discovery procedures by NRF; Agenda Item: 6.5.11; Source: China Mobile; Work Item/Release: 5G_ph1/Rel-15; Document for: Discussion and Approval; Date and Location: Aug. 21-25, 2017, Sophia Antipolis, France, consisting of 3-pages.

\* cited by examiner

METHOD AND APPARATUS FOR SERVICE DISCOVERY

CROSS REFERENCE TO RELATED APPLICATION(S)

This application is a 35 U.S.C. § 371 National Stage of International Patent Application No. PCT/CN2019/095740, filed Jul. 12, 2019, designating the United States, which claims priority to CN application no. PCT/CN2018/101380, filed Aug. 20, 2018.

TECHNICAL FIELD

The non-limiting and exemplary embodiments of the present disclosure generally relate to the technical field of communications, and specifically to methods, apparatuses and computer programs for managing service discovery.

BACKGROUND

This section introduces aspects that may facilitate a better understanding of the disclosure. Accordingly, the statements of this section are to be read in this light and are not to be understood as admissions about what is in the prior art or what is not in the prior art.

Currently core network architecture for the 5$^{th}$ Generation System (5GS) such as new radio (NR) has been proposed. FIG. 1 shows a high level architecture of 5G core network. As shown in FIG. 1, 5G core network (CN) may comprise a plurality of network functions (NF) such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (NF Repository Function).

NF Repository Function (NRF) supports the following functionality:
   Supports service discovery function. Receive NF Discovery Request from NF instance, and provides the information of the discovered NF instances (be discovered) to the NF instance.
   Maintains the NF profile of available NF instances and their supported services.

The NF service discovery is implemented by using the NRF. The NF selection consists in selecting one NF instance among the NF instance(s) discovered during the NF service discovery. The NF selection is implemented by the requester NF, e.g. the SMF selection is supported by the AMF.

For the NRF to properly maintain the information of available NF instances and their supported services, each NF instance informs the NRF of the list of NF services that it supports and other NF instance information, which is called NF profile. The typical information of NF profile could be, as per TS 23.501:
   NF instance ID (Identifier)
   NF type
   PLMN (Public Land Mobile Network) ID
   Network Slice related Identifier(s) e.g. S-NSSAI (Single Network Slice Selection Assistance Information), NSI (Network Slice Instance) ID
   FQDN (Fully Qualified Domain Name) or IP address of NF
   NF capacity information
   NF Specific Service authorization information
   Names of supported services
   Endpoint Address(es) of instance(s) of each supported service
   Identification of stored data/information
   Other service parameter, e.g., DNN (Data Network Name), notification endpoint for each type of notification that the NF service is interested in receiving.
   Routing ID part of SUCI (Subscription Concealed Identifier).
   One or more GUAMI(s) (Globally Unique AMF Identifier), in case of AMF.
   TAI(s) (Tracking Area Identity), in case of AMF.
   UDM Group ID, applicable for UDM only.
   UDR (Unified Data Repository) Group ID, applicable for UDR only.
   AUSF (Authentication Server Function) Group ID, applicable for AUSF only.
   etc.

NF profiles comprises both static and dynamic information for NF, and NF profiles are stored in corresponding NRF.

Registration service enables NF service provider to register its NF profile e.g. supported NF services and other NF instance information in NRF and make it available to be discovered by other NF(s); Discovery service enable NF service consumer to discover the service provided by NF service provider by query the NRF; Depending on the requesting NF and the target NF, different input parameters is included in the discovery request then enable NRF to find a target NF that registered in NRF can serves the requesting NF best.

3GPP defines two types of NRF hierarchy:

In the Network Slicing scenario, multiple NRFs can be deployed at different levels based on network implementation:
   PLMN level (the NRF is configured for the whole PLMN)
   Shared-slice level (the NRF is configured belonging to a set of Network Slices)
   Slice-specific level (the NRF is configured belonging to an S-NSSAI).

In the context of roaming, multiple NRFs may be deployed in the different networks:
   the NRF(s) in the Visited PLMN (known as the vNRF) configured for the visited PLMN.
   the NRF(s) in the Home PLMN (known as the hNRF) configured for the home PLMN, referenced by the vNRF via the N27 interface It can be expected that NF(s) will make a discovery request including the discovery parameters—to find the target NF(s). In 3GPP TS29.510 Release 15, the specific discovery parameters are defined as follows.

| Name | Data type | P | Cardinality | Description |
|---|---|---|---|---|
| service-names | array(string) | M | 1..N | This IE shall contain an array of service names for which the NRF is queried to provide the list of NF profiles. The NRF shall return the NF profiles that have at least one NF service matching the NF service names in this list. The NF service names returned by the NRF |

-continued

| Name | Data type | P | Cardinality | Description |
|---|---|---|---|---|
| | | | | shall be an intersection of the NF service names requested and the NF service names registered in the NF profile. |
| target-nf-type | NFType | M | 1 | This IE shall contain the NF type of the NF Service Producer being discovered. |
| requester-nf-type | NFType | M | 1 | This IE shall contain the NF type of the NF Service Consumer that is invoking the Nnrf_NFDiscovery service. |
| requester-nf-instance-fqdn | Fqdn | O | 0..1 | FQDN of the NF Service Consumer that is invoking the Nnrf_NFDiscovery service. |
| target-plmn | PlmnId | C | 0..1 | This IE shall be included when NF services in a different PLMN need to be discovered. When included, this IE shall contain the PLMN ID of the different PLMN. |
| requester-plmn | PlmnId | C | 0..1 | This IE shall be included when NF services in a different PLMN need to be discovered. When included, this IE shall contain the PLMN ID of the requester NF. |
| target-nf-instance-id | NfInstanceId | O | 0..1 | Identity of the NF instance being discovered. |
| hnrf-uri | Uri | O | 0..1 | Uri of the home NRF. |
| snssais | Array (Snssai) | O | 0..N | If included, this IE shall contain the list of S-NSSAI that are served by the services being discovered. The NRF shall use this to identify the NF services that have registered their support for these S-NSSAIs. The NRF shall return the NF profiles that have at least one S-NSSAI matching the S-NSSAIs in this list. The S-NSSAIs included in the NF services returned by the NRF shall be an intersection of the S-NSSAIs requested and the S-NSSAIs registered in the NF profile. |
| nsi-list | array (string) | O | 0..N | If included, this IE shall contain the list of NSI IDs that are served by the services being discovered. |
| dnn | Dnn | O | 0..1 | If included, this IE shall contain the DNN for which NF services serving that DNN is discovered. DNN may be included if the target NF type is "SMF" or "UPF". |
| smf-serving-area | string | | 0..1 | If included, this IE shall contain the serving area of the SMF. It may be included if the target NF type is "UPF". |
| tai | Tai | O | 0..1 | Tracking Area Identity. |
| ecgi | Ecgi | O | 0..1 | EPS (Evolved Packet System) Cell Global Identity. |
| ncgi | Ncgi | O | 0..1 | NR Cell Global Identity. |
| amf-region-id | string | O | 0..1 | AMF Region Identity. |
| amf-set-id | string | O | 0..1 | AMF Set Identity. |
| guami | Guami | O | 0..1 | Guami used to search for an appropriate AMF. (NOTE) |
| supi | Supi | O | 0..1 | If included, this IE shall contain the SUPI (Subscription Permanent Identifier) of the requester UE to search for an appropriate NF. SUPI may be included if the target NF type is "PCF", "UDM" or "UDR". |
| ue-ipv4-address | Ipv4Addr | O | 0..1 | The IPv4 address of the UE for which a BSF (Binding Support Function) needs to be discovered. |
| ue-ipv6-prefix | Ipv6Prefix | O | 0..1 | The IPv6 prefix of the UE for which a BSF needs to be discovered. |
| pgw | Fqdn | O | 0..1 | If included, this IE shall contain the PGW (PDN GateWay) FQDN which is received by the AMF from the MME to find the combined SMF/PGW. |
| gpsi | Gpsi | O | 0..1 | If included, this IE shall contain the GPSI (Generic Public Subscription Identifier) of the requester UE to search for an appropriate NF. GPSI may be included if the target NF type is "UDM" or "UDR". |
| external-group-identity | GroupId | O | 0..1 | If included, this IE shall contain the external group identifier of the requester UE to search for an appropriate NF. This may be included if the target NF type is "UDM" or "UDR". |
| data-set | DataSetId | O | 0..1 | Indicates the data set to be supported by the NF to be discovered. May be included if the target NF type is "UDR". |
| routing-indicator | string | O | 0..1 | Routing Indicator information that allows to route network signalling with SUCI (see 3GPP TS 23.003 [12]) to an AUSF and UDM instance capable to serve the subscriber. May be included if the target NF type is "AUSF" or "UDM". |
| supported-features | SupportedFeatures | O | 0..1 | List of features required to be supported by the target Network Function. |

SUMMARY

Various embodiments of the present disclosure mainly aim at providing methods, apparatuses and computer programs for service discovery. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method implemented at a primary Network-Function Repository Function, NRF, in a communication network, wherein the communication network comprising at least one primary NRF and at least one secondary NRFs, the method comprising: receiving a discovery request from a first secondary NRF, wherein the discovery request comprises a service query information for a target Network Function, NF, obtaining an target NF information, providing the target NF information to the first secondary NRF.

In a second aspect of the disclosure, there is provided a method implemented at a secondary Network-Function Repository Function, NRF, in a communication network, wherein the communication network comprising the primary NRF and at least one secondary NRFs, the method comprising: receiving a discovery request from a first Network Function, NF, wherein the discovery request comprises a service query information for a target NF; obtaining target NF information; providing the target NF information to the first NF.

In a third aspect of the disclosure, there is provided a method implemented at a secondary Network-Function Repository Function, NRF, in a communication network, wherein the communication network comprising the primary NRF and at least one secondary NRFs, the method comprising: receiving a discovery request from a primary NRF, wherein the discovery request comprises a service query information for a target NF, determining if the secondary NRF contains the target NF based on the service query information, sending response to the primary NRF.

In a fourth aspect of the disclosure, there is provided an implemented at primary Network-Function Repository Function, NRF, comprising: a processor; and a memory coupled to the processor, said memory containing instructions executable by said processor, whereby said apparatus is operative to: receiving a discovery request from a first secondary NRF, wherein the discovery request comprise a service query information for a target Network Function, NF, obtaining an target NF information, providing the target NF information to the first secondary NRF.

In a fifth aspect of the disclosure, there is provided an a secondary Network-Function Repository Function, NRF, comprising: a processor; and a memory coupled to the processor, said memory containing instructions executable by said processor, whereby said apparatus is operative to: receiving a discovery request from a first Network Function, NF, wherein the discovery request comprises a service query information for a target NF; obtaining target NF information; providing the target NF information to the first NF.

In a sixth aspect of the disclosure, there is provided an a secondary Network-Function Repository Function, NRF, comprising: a processor; and a memory coupled to the processor, said memory containing instructions executable by said processor, whereby said apparatus is operative to: receiving a discovery request from a primary NRF, wherein the discovery request comprises a service query information for a target NF, determining if the secondary NRF contains the target NF based on the service query information, sending response to the primary NRF.

In a seventh aspect of the disclosure, there is provided a computer program, comprising instructions which, when executed on at least one processor, cause the at least one processor to carry out the method according to the first aspect of the disclosure.

In an eighth aspect of the disclosure, there is provided a computer program, comprising instructions which, when executed on at least one processor, cause the at least one processor to carry out the method according to the second aspect of the disclosure.

In a ninth aspect of the disclosure, there is provided a computer-readable storage medium storing instructions which when executed by at least one processor, cause the at least one processor to perform the method according to the first aspect of the disclosure.

In a tenth aspect of the disclosure, there is provided a computer-readable storage medium storing instructions which when executed by at least one processor, cause the at least one processor to perform the method according to the second aspect of the disclosure.

Some embodiments of the disclosure may have the following advantage. The invention enables NF in 5G network to make service discovery across different regions.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
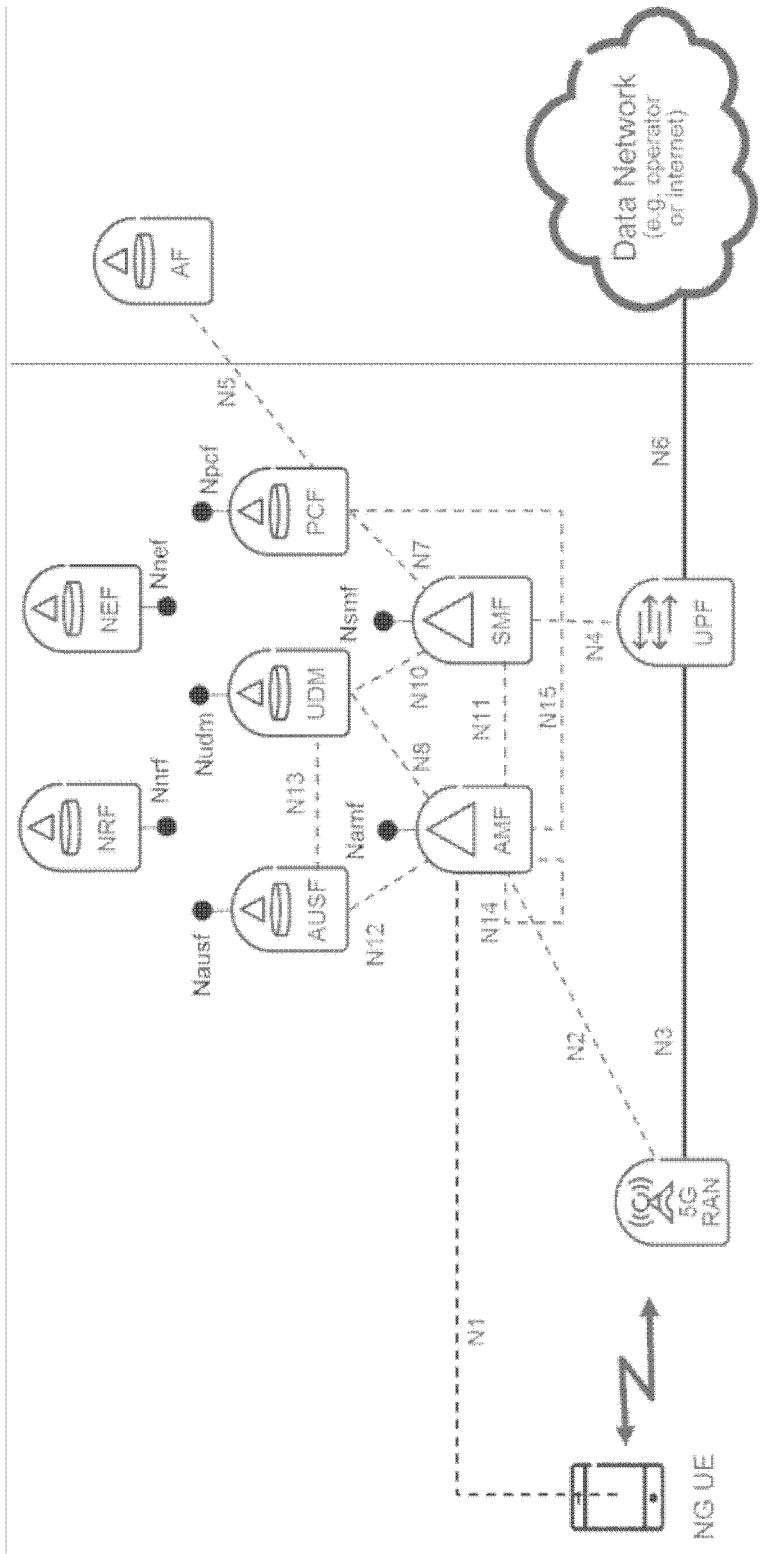
FIG. 1 illustrates a schematic 5G core network.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "network" refers to a network following any suitable communication standards, such as LTE-Advanced (LTE-A), LTE, Wideband Code Division Multiple Access (WCDMA), High-Speed Packet Access (HSPA), NR and so on. Furthermore, the communications between a terminal device and a network device in a wireless communication network may be performed according to any suitable generation communication protocols, including, but not limited to, the third generation (3G), the fourth generation (4G), 4.5G, the future fifth generation (5G) communication protocols such as NR, wireless local area network (WLAN) standards, such as the IEEE 802.11 standards; and/or any other appropriate wireless communication standard, such as the Worldwide Interoperability for Microwave Access (WiMax) and/or any other protocols either currently known or to be developed in the future.

The term "network function (NF)" refers to any suitable function which can be implemented in a network device of a wireless/wired communication network via which a terminal device can access the network and receives services therefrom. For example, in 5G network, the NF may comprise AMF, SMF, AUSF, UDM, PCF, AF, NEF, UPF and NRF. It is noted that the NF may comprise different NFs depending on a specific type of network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device.

As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 2:
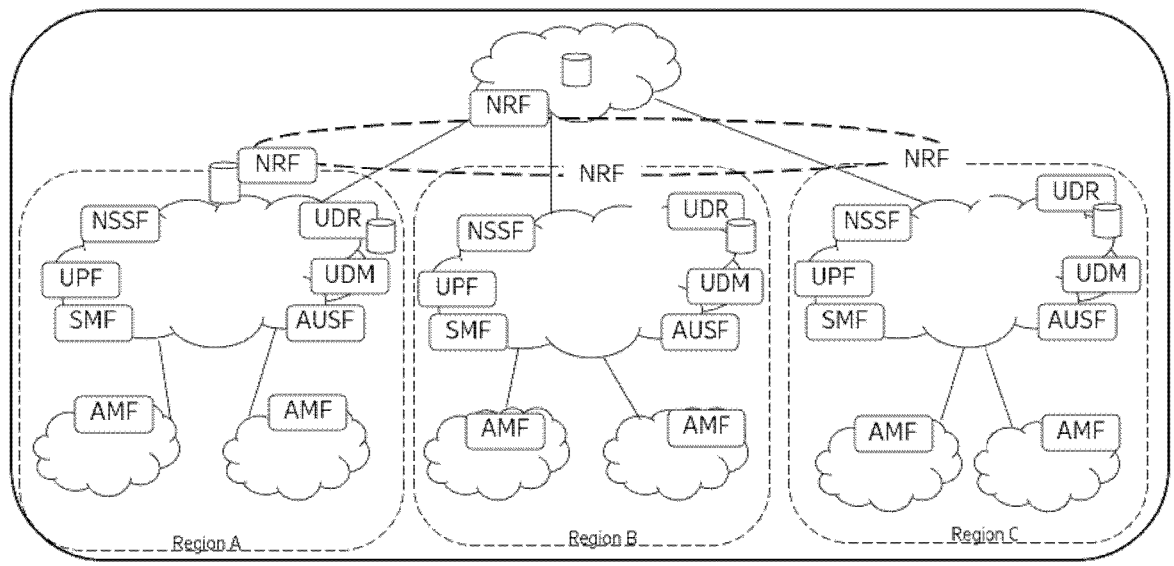
FIG. 2 illustrates another type of network hierarchy.

Although the two types of the NRF hierarchy in 3GPP, another type of NRF hierarchy (as shown in FIG. 2) is clearly needed by major operators who normally divided their large network into small subnetworks based on geography area for better management.

The network can be divided into several regions, for example, based on the province border. In FIG. 2, the network is divided into 3 regions, region A-C. In every region, there is a corresponding NRF, and at least one NF, such as AMF, SMF, UPF, NSSF (Network Slice Selection Function), AUSF, UDM, UDR, etc. And the NRF maintains the NF profile of available NF instances and their supported services.

It can be expected that in the same region, NF(s) will discover and invoke service towards NF(s) though the NRF. But when the NF(s) in the same region can't support the service that the source target NF(s) request, then NF(s) need to discover and invoke service towards NF(s) in other regions, it is then expected that PLMN NRF (here also called central NRF) and/or the other region NRF will help on the service discovery. This kind of cross-region, service discovery can happen in the following scenario:

When a user is moving from its home region to a visited region, the visited AMF will then discover the UDM in another region to get the users subscription profile;

When the inter-AMF handover procedure is triggered in the region border, the target AMF will then discover the source AMF in another region to get UE mobility context.

Accordingly, the query parameters such as FQDN, URI, IP address, TAI, cell ID, node ID, UE IP address, UE identity e.g. SUPI (Subscription Permanent Identifier), GPSI (Generic Public Subscription Identifier), group ID, or routing ID can be specific per region.

NRF is important for setting up the signaling path in Control Plane, as every NF need query NRF to find a proper next hop NF (or NF service) instance per traffic context. However, in the scenario of network deployment based on geography area (or other similarly independent deployment realm, e.g. slice, domain) showed above, for cross region service discovery (or service discovery among other similar independent deployment realm, e.g. slice, domain), it is not clear, how the regional NRF can find the proper peer regional NRF to discover the target NF(s). In particular, it is hard for source NRF to determine the target NRF, when different input parameters are included in the discovery request.

To overcome or mitigate at least one of above mentioned problems or other problems or provide an alternative solution, the embodiments of the present disclosure propose a solution for service discovery.

Figure 3:
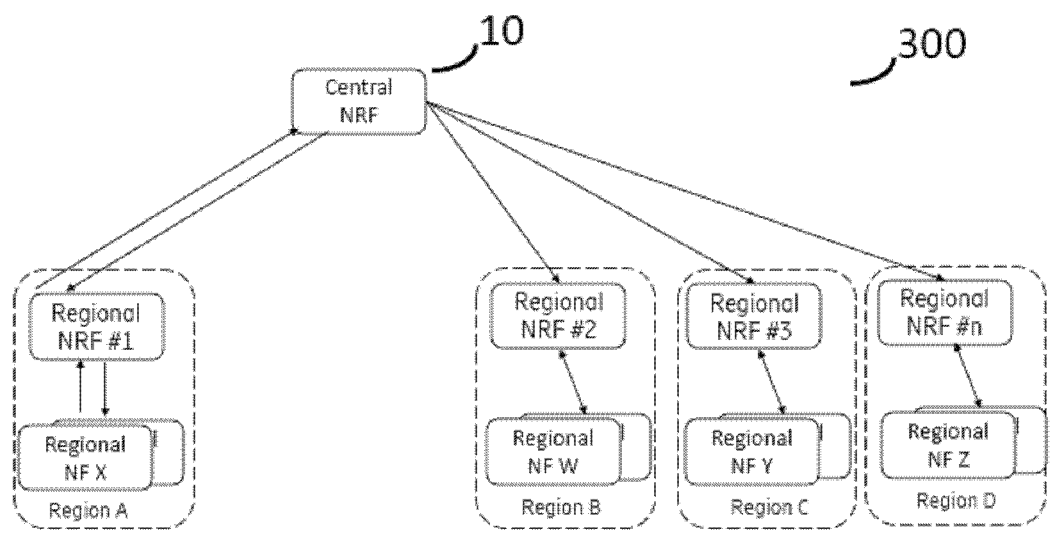
FIG. 3 illustrates another type of NRF hierarchy.

Reference is now made to FIG. 3, the communication system 400 comprises at least one central NRF 10 and at least one regional NRF (as Regional NRF #1, Regional NRF #2, Regional NRF #3, ..., Regional NRF #n). In every area (as region A), there is a regional NRF (as Regional NRF #1) and at least one NF (as NF X in region A). The NF in the specific area register its NF profile to its own regional NRF, for example, NF X registers its NF profile to regional NRF #1. The regional NRF maintains the NF profile of available NF instances (as NF X) and the supported services.

Figure 4:
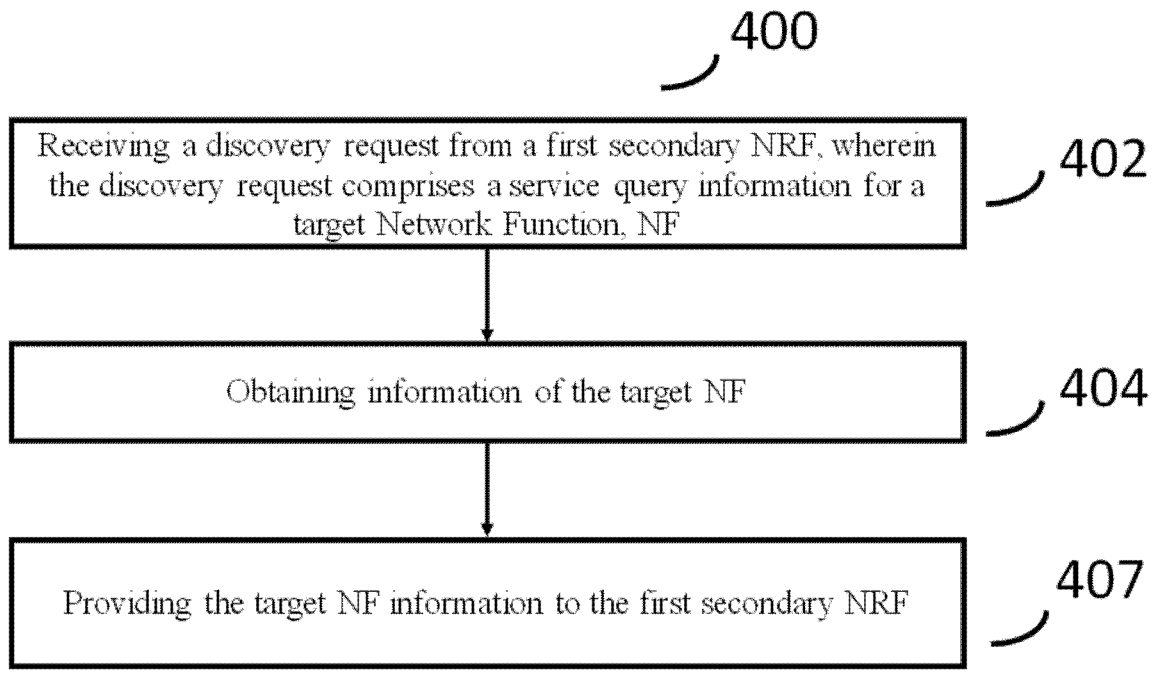
FIG. 4 illustrates a flowchart of a method implemented at a primary NRF according to an embodiment of the present disclosure.

Reference is now made to FIG. 4, which shows flowcharts of methods according to embodiments of the present disclosure. The methods may be implemented at a primary NRF (the Central NRF shown in FIG. 3) such as PLMN NRF.

As shown in FIG. 4, the method 400 may comprise: receiving a discovery request from a first secondary NRF, wherein the discovery request comprises a service query information for a target Network Function, NF, at block 402, and obtaining target NF information at block 404, and providing the target NF information to the first secondary NRF at block 406. Before block 402, the regional NF (e.g. NF X) need a certain type of service, so it sends discovery request with service query parameters to regional NRF it registered (e.g. Regional NRF #1) to request the service. And then the regional NRF will check the information stored in itself to find out if there is any NF registered in it can provide this service. If there is a target NF can provide the service, then the regional NRF #1 will send the target NF information to NF X. But if there is no NF registered in the NRF can provide such type of service, then the regional NRF #1 will forward the discovery request with service query parameters to another NRF, e.g. the central NRF, and at block 402 the central NRF receives the discovery request.

In another alternative embodiment, the central NRF may receive the discovery request from a NF, e.g. NF X directly. And then the central NRF performs the following steps (step 404 and 406).

At block 404, the central NRF obtains the target NF information. The target NF information can be obtained in various ways.

In an embodiment, the primary NRF (central NRF) check the information stored in itself and determine if it contains the target NF information based on the service query information. If it contains the target NF information (NF Y) mapping, it will send the target NF information (NF Y) and/or the information of the NRF (regional NRF #3) in which the target NF is registered to the first secondary NRF (regional NRF #1). If there is no target NF information found, the central NRF may send the discovery request to at least one of other secondary NRFs (Regional NRF #2, Regional NRF #3, ..., Regional NRF #n).

In another embodiment, the primary NRF (central NRF) may directly send the discovery request to at least one of other secondary NRFs (Regional NRF #2, Regional NRF #3, ..., Regional NRF #n) without check in the information stored in itself; and receives a response from at least one of other secondary NRFs.

As the first embodiment of obtaining the target NF information, the central NRF sends the discovery request to the other regional NRFs (e.g. Regional NRF #2, Regional NRF #3, ..., Regional NRF #n), and then the regional NRFs will check the information stored in itself to find if it contains the NF (the target NF) that can provide the service to the NF X (here every NF in all regions has registered its NF profile in the corresponding NRF before). The discovery request can be sent to other regional NRFs in different ways: broadcasting, polling, and multicasting, etc.

As the broadcasting, the central NRF broadcasts the discovery request to all regional NRFs, then the regional NRF will check if it contains the target NF, and make a response.

As the polling, the central NRF sends the discovery request to one regional NRF at first time, and then the regional NRF will check if it contains the target NF, and make a response, if the response indicates the regional NRF doesn't contain the target NF, then then central NRF will send the discovery request to another regional NRF, ..., until the central NRF receives the response indicating that the regional NRF contains the target NF.

As the multicasting: in one example, the central NRF selects one or more NRFs from the other secondary NRFs based on the service query information, and then multicasts the discovery request to the regional NRFs selected (for example: the service query parameter can be linked to a certain scope of region areas, and the central NRF selects all NRFs which are serving those areas). In another example, the central NRF may maintain a routing table for mapping the service query information and the target NF information and/or the information of the regional NRF, the routing table is updated based on the response from the regional NRF; and the regional NRF can also register itself in the central NRF with its address, and the NRF property (e.g. region information: region ID, group ID etc). For example, when a regional NRF checks that it contains the target NF, it includes the target NF information and/or the information of itself (this regional NRF) into the response, and sends the response to the central NRF, after the central NRF receives the response, it will update the routing table, and then when the central NRF received a discovery request from the regional NRF, such as Regional NRF #1, it will select one or more regional NRFs based on the routing table and/or the service query information.

After the central NRF obtains the target NF information, the central may store information that mapping the service query parameters and the target NF information, and/or information of another NRF e.g. regional NRF #3. So that the central NRF can learn from the previous requests, then it can make a quick response when it receives the discovery request including the same service query parameters.

As the second embodiment of obtaining the target NF information, the central NRF may receive registration information from one or more secondary NRFs, and the target NF information is obtained based on the registration information. In an embodiment, the central NRF maintains routing table information for mapping the information of NRFs and the information of NFs which are registered in the corresponding NRF. In one embodiment, a blank routing table may be created, and one or more regional NRF register itself to the central NRF with its registration information, wherein the registration information comprises a record for mapping the information of the regional NRF and the information of NF which is registered in the regional NRF. After the central NRF receives the registration information from the regional NRFs, it will update the routing table based on the registration information.

In one embodiment, the registration information may comprise at least part of the NF profile of the regional NRF, wherein the NF profile of the regional NRF comprising: NRF's profile and NRF specific information; wherein the NRF's profile comprising at least part of following information of the NRF:

NF instance ID, NF type; service name, PLMN ID, FQDN, S-NSSAI, NSI, IP address, region ID, ECGi, NCGI, TAI; DNN, group ID, SUPI ranges, GPSI ranges, external Group Identifiers Ranges; Data Set ID; routing ID of SUCI;

The NRF specific information comprising at least part of the information of the NFs which are registered in the regional NRF. For example, one UDM and one UPF have registered in the NRF, then the NRF specific information comprises the NF file of the UDM and the NF file of the UDM.

The routing table may comprise one or more of the following information:
  The regional NRF address (e.g. FQDN, IP address, URL);
  The regional NRF local property such as region ID, group ID, SUPI ranges, GPSI range, IP address ranges
  Its association with the NF profile of NF registered in the NRF
  (Optional) The NF file or part of NF file And after receiving the discovery request from the regional NRF #1, in an embodiment, if the routing table contains the NF file (or part of NF file) of the NF registered in the NRF, the central NRF may determine the target NF based on the routing table, and then send the target information to regional NRF #1. In another embodiment, if the routing table doesn't contain the NF file of the NF registered in the NRF, the central NRF can't get the target NF information, the central NRF may select the one or more regional NRFs from the other regional NRFs (Regional NRF #2, Regional NRF #3, . . . , Regional NRF #n) based on the routing table information, and then sends the discovery request the regional NRFs selected. The regional NRFs will check the information stored in itself to find if it contains the NF (the target NF) that can provide the service to the NF X, and send response to central NRF.

In an embodiment, the central NRF may broadcast the routing table to the regional NRF (Regional NRF #1, Regional NRF #2, Regional NRF #3, . . . , Regional NRF #n), so that the regional NRF can make a quick response when the similar discovery request comes next time.

The response from the regional NRF (Regional NRF #2, Regional NRF #3, . . . , Regional NRF #n) to central NRF may comprise different information. For example, if the regional NRF find it contains the target NF, the response may comprise the target NF information, or may comprise the indication of whether it contains the target NF information (e.g.: OK), or may comprise the both information above. If the regional NRF find it doesn't contain the target NF, the response may comprise the indication of whether it contains the target NF information (e.g.: No found), or may not response to NRF. And the target NF information may comprise the NF profile of the target NF (NF Y).

After the central obtains the target information, it will send the response including the target NF (NF Y) information to the regional NRF (regional NRF #1). In another embodiment, the response may further comprise information of the corresponding regional NRF (regional NRF #3), such as the address of regional NRF #3.

Figure 5:
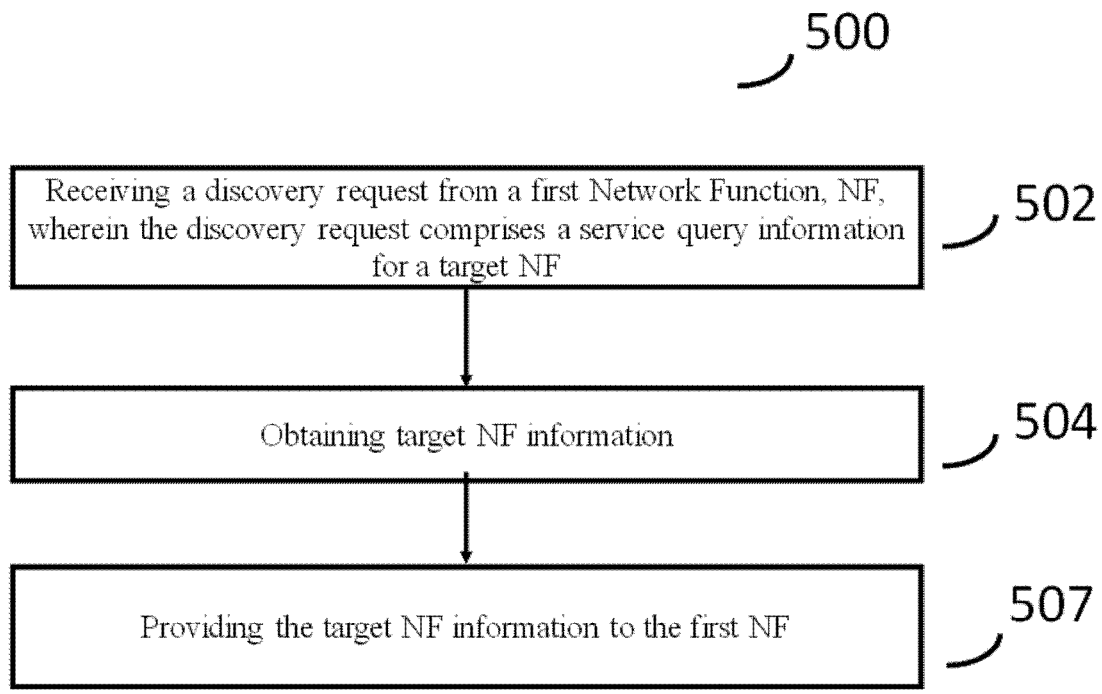
FIG. 5 illustrates a flowchart of a method implemented at a secondary NRF according to an embodiment of the present disclosure.

FIG. 5 shows a flowchart of method 500 according to an embodiment of the present disclosure. As shown in FIG. 5, The methods may be implemented at a first secondary NRF (source NRF as regional NRF #1 shown in FIG. 3).

As shown in FIG. 5, the method 500 may comprise: receiving a discovery request from a first Network Function, NF, wherein the discovery request comprises a service query information for a target NF at block 502; obtaining target NF information at block 504; providing the target NF information to the first NF at block 506.

Before block 502, a source NF (NF X in region A) need a service from other NF, so NF X triggers a discovery request including the service query parameters.

As the discovery request, it refers to at least the requests of Nnrf_NFDiscovery and Nnrf_NFManagement, OAuth2 Authorization as defined in 3GPP 29.510, and correspondingly, discovery response refers to at least, the response of the above-mentioned requests.

As the service query parameters, it refers the filtering criteria that is included in the discovery request; it shall at least include the URI query parameters of Nnrf_NFDiscovery service and subcriptionData of Nnrf_NFManagement service as defined in 3GPP 29.510. The service query parameters may comprise at least one of the following: NFType, service Name, NF SetID, PLMN ID, FQDN, URI, IP address, NSSAI, NSI, DNN, TAI, cell ID (E-UTRAN Cell Global Identifier, ECGI, NR Cell Global Identifier, NCGI), NF instance ID, AMF region ID, AMF set ID, GUAM, UE IP address, UE identity (e.g. SUPI, GPSI, group ID), or routing ID of SUCI etc.

NF X sends the discovery request including the service query parameters to the regional NRF #1 (regional NRF #1 and the NF X are in the same region A), and the regional NRF #1 will receive the discovery request at the block 502.

At block 504, the regional NRF #1 obtains target NF information. In an embodiment, the regional NRF #1 may determine if it contains the target NF based on the service query parameters. The regional NRF #1 will match the NF profile of the NF registered in it, and if one of the NF profile of the NF can match the service query parameters, then the regional NRF #1 will send the target NF information to NF X, then the flow will stop. But if the regional NRF #1 can't find the target NF, then it will forward the discovery request to another NRF, e.g. the central NRF. Then the central NRF will find the target with the above-mentioned method, if the central NRF find the target NF (NF Y), it will send the target information to the regional NRF #1, then the regional NRF #1 will send the target NF information to NF X. The target information may be the NF file of the target NF, or the target information may be part of the NF file or other information that could make NF X reach NF Y directly or indirectly.

In an embodiment, the regional NRF #1 may storing the record that mapping the service query parameters and the target NF information, and/or information of another NRF e.g. regional NRF #3. So that the regional NRF #1 can learn from the previous requests, then it can make a quick response when it receives the discovery request including the same service query parameters.

In an embodiment, the regional NRF #1 may have knowledge of the exact target regional NRF contain the target NF, it can forward the discovery request directly to the target regional NRF. For example, the regional NRF #1 is preconfigured to store the information that the regional NRF #3 contains the target NF (NF Y) which can provide service to NF X, then regional NRF #1 will forward the discovery request directly to the target regional NRF #3. And then after the regional NRF #3 confirm that it contains the target NF Y, it will send the NF Y information to regional NRF #1, and regional NRF #1 will send the NF Y information to NF X. Therefore, a communication link can be established between NF X and NF Y, so that NF Y can provide the service to NF X.

In an embodiment, the regional NRF may receive register request from the NF, wherein the register request comprising NF profile of the NF, then update NF profile of the itself, and send registration information to the central NRF, wherein the registration information comprises the NF profile of the regional NRF, e.g. including the mapping information of the secondary NRF and the information of NF which is registered in the regional NRFs. Then the central NRF will know the NF file of all the regional NRF so that it can select the specific NRFs to multicast when it receives a discovery request.

Figure 6:
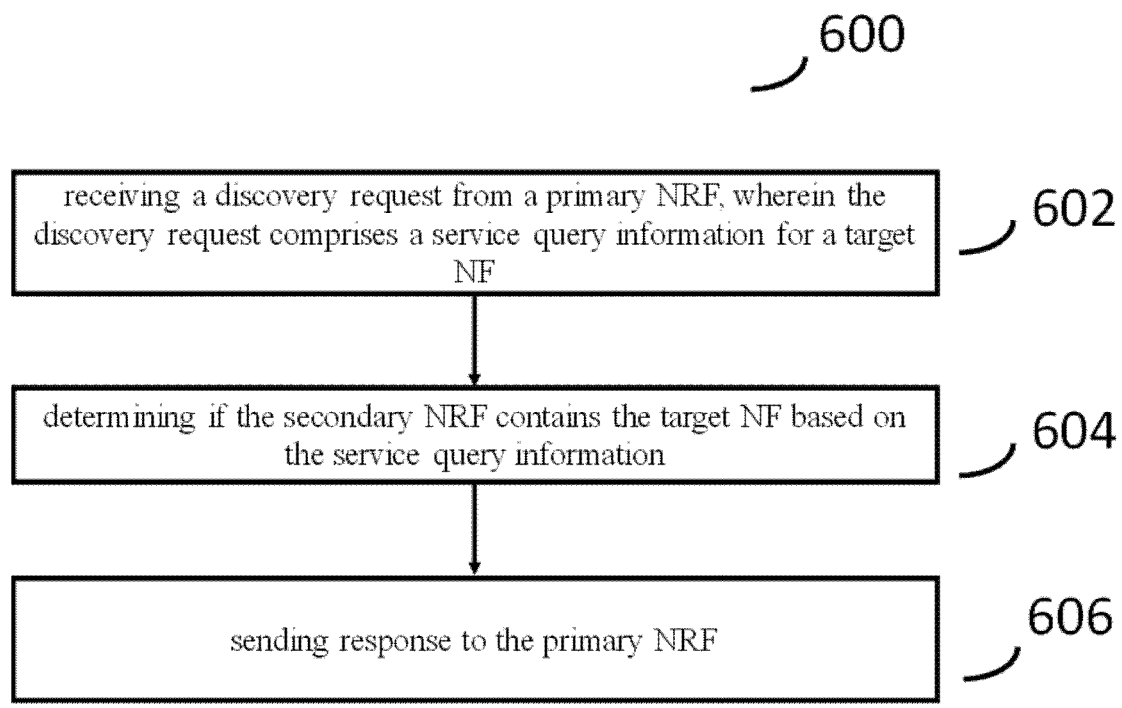
FIG. 6 illustrates a flowchart of a method implemented at a secondary NRF according to an embodiment of the present disclosure.

FIG. 6 shows a flowchart of method 600 according to an embodiment of the present disclosure. As shown in FIG. 6, The methods may be implemented at a secondary NRF (as regional NRF #2, #3, . . . , #n shown in FIG. 3).

As shown in FIG. 6, the method 600 may comprise: receiving a discovery request from a NRF (e.g. central NRF in FIG. 3), wherein the discovery request comprises a service query information for a target NF at block 602; determining if the secondary NRF contains the target NF based on the service query information at block 604; sending response to the primary NRF at block 606.

As mentioned-above, the regional NF (e.g. NF X) need a certain type of service, so it sends discovery request with service query parameters to regional NRF it registered (e.g. Regional NRF #1) to request the service. And then the regional NRF will check the information stored in itself to find out if there is any NF registered in it can provide this service. If there is no NF registered in the NRF can provide such type of service, then the regional NRF #1 will forward the discovery request with service query parameters to the central NRF, and the central NRF receives the discovery request. And then central NRF will send the discovery request to the other regional NRF (one or more of regional NRF #2, #3, . . . , #n). And the regional NRF may receive a discovery request from a primary NRF (central NRF), wherein the discovery request comprises a service query information for a target NF at block 602.

And in another embodiment, the communication network may do not contain the central NRF, and all the regional NRF may be equal. In this scenario, the regional NRF may receive the discovery request from another regional NRF (e.g. regional NRF #1), and correspondingly after the regional determine it contains the target NF shown below in block 604, it will send response to regional NRF #1.

At block 604, the regional NRF determine if it contains the target NF based on the service query information. The regional NRF determines if it contains the target NF by matching the service query information and NF profile of NFs registered in the secondary NRF. If there is no NF file in the regional NRF can match the service query information, the regional NRF may response including the indication of "No found" to the central NRF, or the regional NRF may don't make a response.

If the NF profile of the NF can match the service query information, determine that the NF is the target NF, and send response including the target NF information (NF Y) to the primary NF, and the response may further comprise the indication of finding the target NF (such as "OK"). The target information maybe the NF file of the target NF, maybe be part of the NF file or other information that could make NF X reach NF Y directly or indirectly.

Then the central may forward the target information to the regional NRF #1, and NRF #1 forward the target information to NF X. Therefore, a communication link can be established between NF X and NF Y, so that NF Y can provide the service to NF X.

In an embodiment, the regional NRF may receive register request from the NF, wherein the register request comprising NF profile of the NF, then update NF profile of the itself, and send registration information to the central NRF, wherein the registration information comprises the NF profile of the regional NRF, e.g. including the mapping information of the secondary NRF and the information of NF which is registered in the regional NRF. Then the central NRF will know the NF file of all the regional NRF so that it can select the specific the NRFs to multicast when it receives a discovery request.

Figure 7:
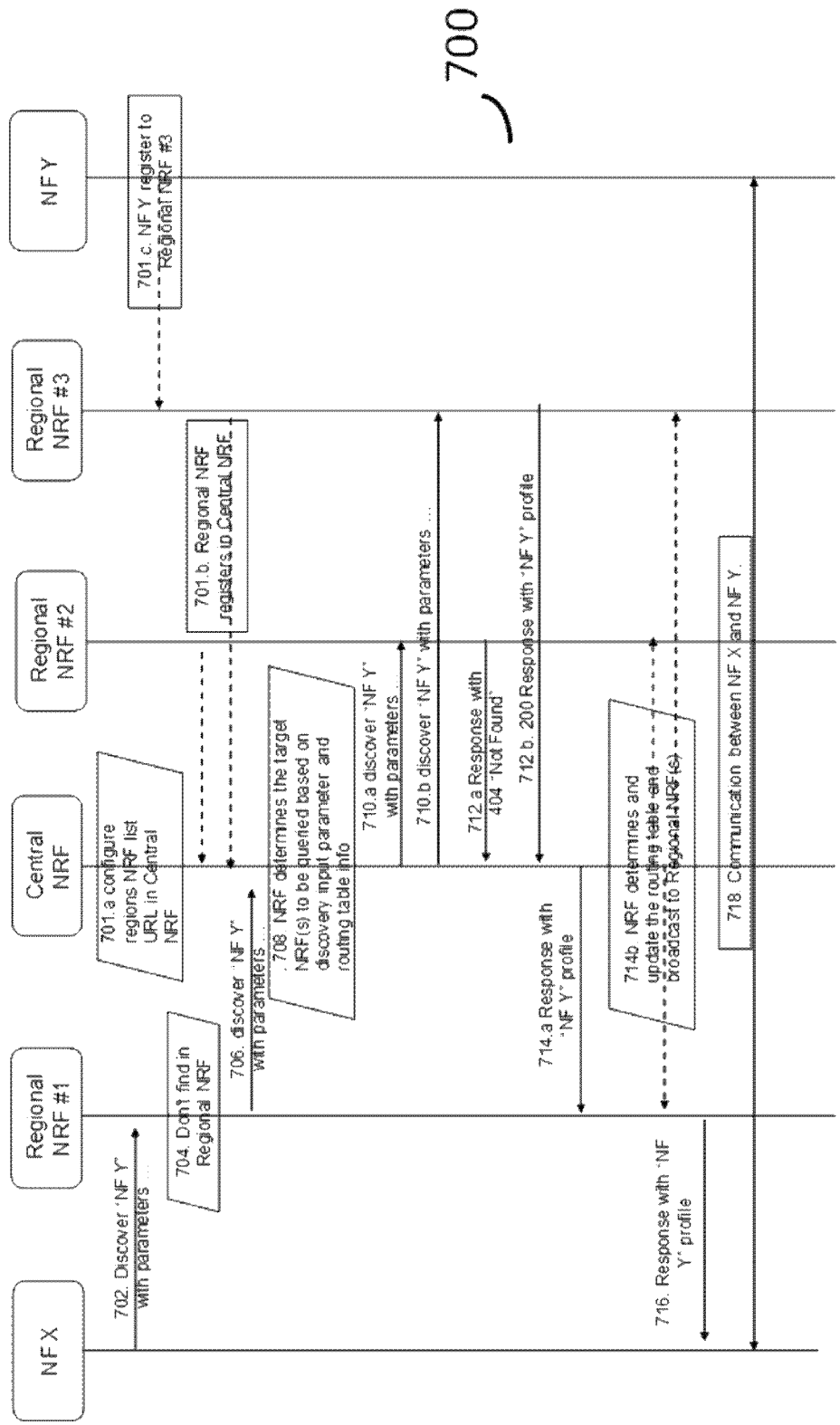
FIG. 7 illustrates a flowchart of a method according to another embodiment of the present disclosure.

FIG. 7 shows a flowchart of one method according to an embodiment of the present disclosure. As shown in FIG. 7, the method is implemented in the communication system. For some parts which have been described in the above embodiments, detailed description thereof is omitted here for brevity.

At 701*a*, the central NRF (PLMN NRF) may configure regions NRF list URL for forwarding the service request to the regional NRF(s), and at 701*b*, the regional NRF may register itself in the central NRF with its address, and the NRF property like region information region ID, group ID.

At 702, the NF X (a service consumer, e.g. AMF) triggers discover "NF Y" (a service producer, e.g. UDM) with the service query parameters towards its own regional NRF, i.e. regional NRF #1; Within the discovery request, there are the service query parameters e.g. SUPI.

At 704, The regional NRF #1 can not find the NF profile of NF Y, as NF Y is not located and registered in this region.

At 706, the regional NRF #1 then forward the discovery request to the Central NRF with all the service query parameters. Optionally if regional NRF #1 have knowledge of the exact target regional NRF matching the service query parameters, e.g. got from a previous request. The regional NRF #1 can then forward the discovery request directly to the target regional NRF.

After receiving the discovery request, the central NRF may optionally check the information stored in itself and determine if it contains the target NF information based on the service query information. If it contains the target NF information (NF Y), it will send the target NF information (NF Y) and/or the information of the NRF (regional NRF #3) in which the target NF is registered to the first secondary NRF (regional NRF #1). If there is no target NF information found, goes to step 708.

At 708, the central NRF checks the input service query parameters and determines the next hop NRF(s) to be queried. Multiple regional NRFs can be selected. The selection can be based on the service query parameters and or the available routing table information. For example, the service query parameter can link to a certain scope of region areas. The PLMN NRF then selects all NRFs serving those areas.

At 710, the central NRF forwards the discovery request to those regional NRF(s).

At 712, the regional NRF(s) checks the service query parameters and determine whether it contains the requested NF. If the regional NRF does not contain NF profile of NF Y, it response not found back to the central NRF at 712a; If the regional NRF contains NF profile of NF Y, it response successfully back to the central NRF;

At 714, the central NRF then forwards the successful result and NF profile of NF Y back to the regional NRF #1. Optionally the central NRF can also return the address of the target regional NRF #3, it will help to build a routing table in regional NRF #1 and enable a direct query between regional NRF #1 and #3 when the next time similar request comes. Optionally the central NRF can create or update a routing table information, recording the mapping between, the input service query parameter, the target NF of query, and the target regional NRF. It will help to a fast response when the next time similar request comes. central NRF may also trigger a broadcast to distribute such routing table information to all regional NRF(s).

At 716, the regional NRF #1 then response the successful result and NF profile of NF Y back to NF X. Optionally, if the regional NRF triggers the multicast discovery, the regional NRF can create a local information, recording the mapping between, the input service query parameter, the target NF of query, and the target regional NRF. It will help to a fast response when the next time similar request comes At 718, NF x then set up communication with NF Y.

Figure 8:
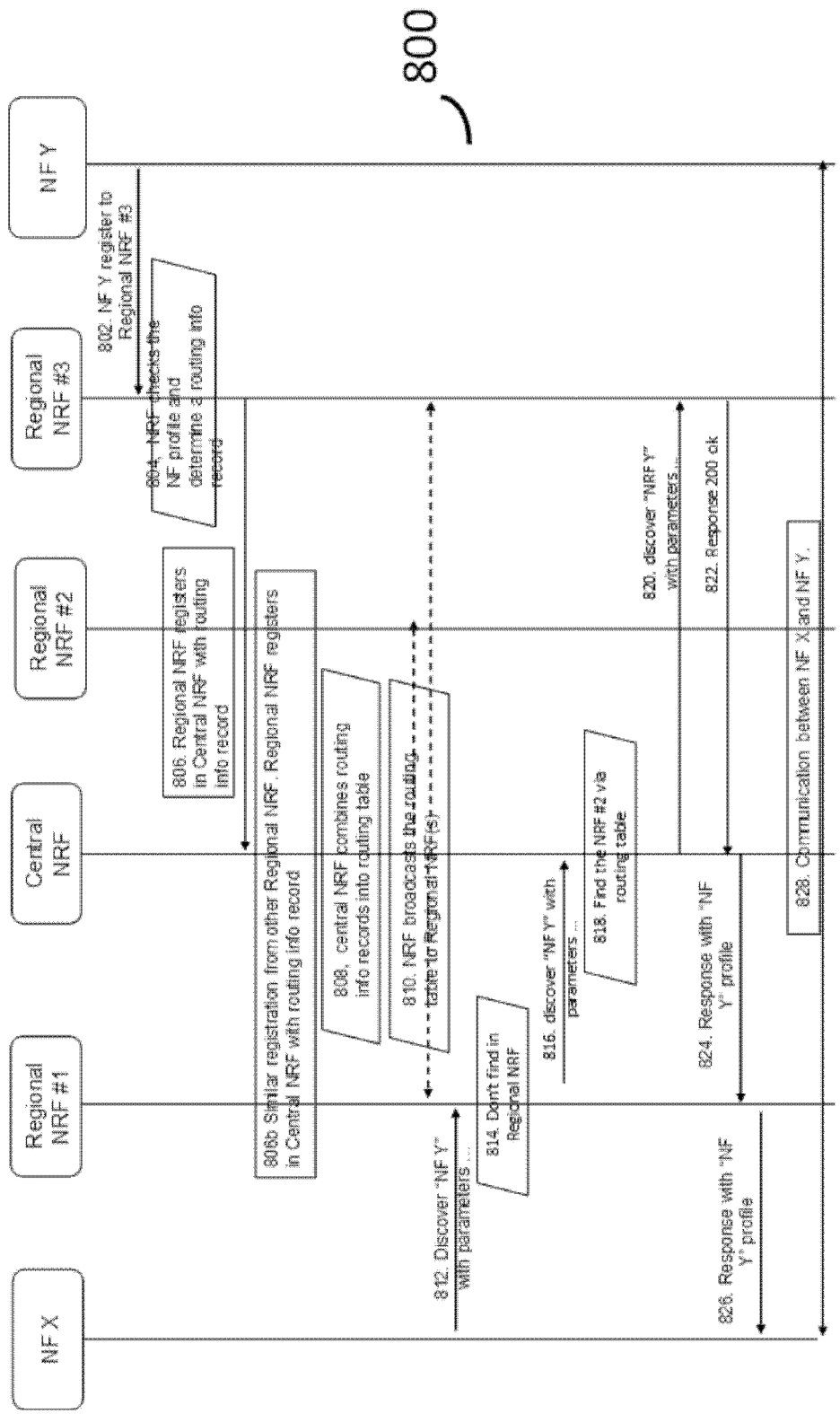
FIG. 8 illustrates a flowchart of a method according to another embodiment of the present disclosure.

FIG. 8 shows a flowchart of another method according to an embodiment of the present disclosure. As shown in FIG. 8, the method is implemented in the communication system. For some parts which have been described in the above embodiments, detailed description thereof is omitted here for brevity.

At 802, a NF, e.g. NF Y, registers itself in the its own region NRF, with its NF profile.

At 804, The regional NRF, checks the NF profile and determine a routing information record for its own region. The routing information record is built upon, the NF Y's NF profile and its attributes (as defined in 3GPP TS 29.510), the regional NRF identifier and address, and the region information e.g. region ID.

At 806, The regional NRF registers itself in central NRF, with its NF profile and routing information record. For example, routing information record can be part of the NRF's NF profile. Similar procedure repeated for all regional NRFs to register themselves in central NRF.

At 808, The central NRF then creates or updates a routing table information, based on the routing information record registered by regional NRFs.

At 810, the central NRF may also trigger a broadcast to distribute such routing table information to all regional NRF(s).

At 812, NF X (a service consumer, e.g. AMF), trigger discovery request to find NF Y (a service producer, e.g. UDM) towards its own region NRF, e.g. regional NRF #1. Within the discovery request, there are the service query parameters e.g. SUPI.

At 814, the regional NRF #1 cannot find the NF profile of NF Y, as NF Y is not located and registered in this region. Optionally if regional NRF #1 have a routing table from previous request and have knowledge of the exact target regional NRF matching the service query parameters. The regional NRF #1 can then forward the discovery request directly towards the target regional NRF.

At 816, the regional NRF #1 then forward the discovery request to the central NRF with the service query parameters.

At 818, the central NRF checks the input service query parameters and determines the next hop NRF(s) to be queried. The selection can be based on the service query parameters and/or the available routing table information. For example, the service query parameter, SUPI, can link to SUPI range of a routing information record. The central NRF then selects the NRF associated with that routing information record.

At 820, the central NRF forward the discovery request to the selected regional NRF.

At 822, the regional NRF checks the service query parameters and determine whether it contains the requested NF. If the regional NRF does not contain NF profile of NF Y, it response not found back to the central NRF; if the regional NRF contains NF profile of NF Y, it response successfully back to the central NRF.

At 824, the central NRF then sends the successful result and NF profile of NF Y back to it upstream, the regional NRF #1.

At 826, the regional NRF #1 then response the successful result and NF profile of NF Y back to NF x.

At 828, NF x then set up communication with NF Y.

Figure 9A:
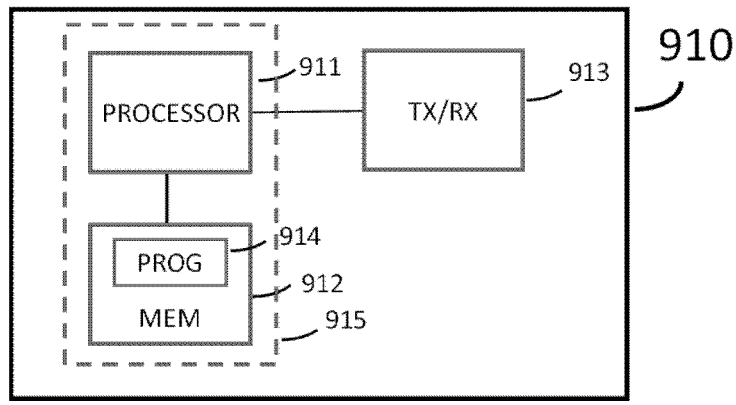
FIG. 9a-9c illustrate simplified block diagrams of an apparatus in a primary NRF and a secondary NRF, respectively, according to an embodiment of the present disclosure.
Figure 9B:
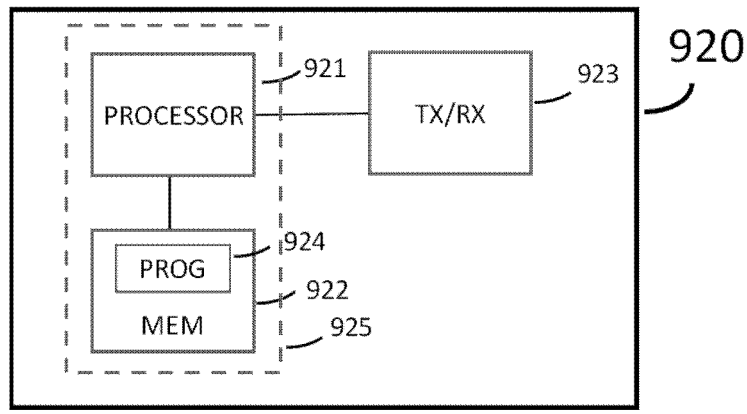
Figure 9C:
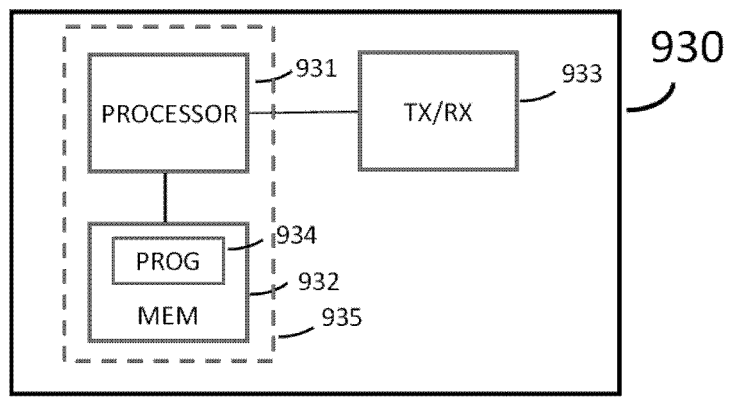

FIG. 9a illustrates a simplified block diagram of an apparatus 910 that may be embodied in/as central NRF according to an embodiment of the present disclosure. FIG. 9b illustrates an apparatus 920 that may be embodied in/as a first regional NRF according to an embodiment of the present disclosure. FIG. 9C illustrates an apparatus 930 that may be embodied in/as a regional NRF according to an embodiment of the present disclosure.

The apparatus 910 may comprise at least one processor 911, such as a data processor (DP) and at least one memory (MEM) 912 coupled to the processor 911. The apparatus 910 may further comprise a transmitter TX and receiver RX 913 coupled to the processor 911. The MEM 912 stores a program (PROG) 914. The PROG 914 may include instructions that, when executed on the associated processor 911, enable the apparatus 910 to operate in accordance with the embodiments of the present disclosure, for example to perform the methods 200 and a part of methods 700, 800. A combination of the at least one processor 911 and the at least one MEM 912 may form processing means 915 adapted to implement various embodiments of the present disclosure.

The apparatus 920 comprises at least one processor 921, such as a DP, and at least one MEM 922 coupled to the processor 921. The apparatus 920 may further comprise a transmitter TX and receiver RX 923 coupled to the processor 921. The MEM 922 stores a PROG 924. The PROG 924 may include instructions that, when executed on the associated processor 921, enable the apparatus 920 to operate in accordance with the embodiments of the present disclosure, for example to perform the methods 500 and a part of methods 700, 800. A combination of the at least one processor 921 and the at least one MEM 922 may form processing means 925 adapted to implement various embodiments of the present disclosure.

The apparatus 930 comprises at least one processor 931, such as a DP, and at least one MEM 932 coupled to the processor 931. The apparatus 930 may further comprise a transmitter TX and receiver RX 933 coupled to the processor 931. The MEM 932 stores a PROG 934. The PROG 934 may include instructions that, when executed on the associated processor 931, enable the apparatus 930 to operate in accordance with the embodiments of the present disclosure, for example to perform the methods 600 and a part of methods 700, 800. A combination of the at least one processor 931 and the at least one MEM 932 may form processing means 935 adapted to implement various embodiments of the present disclosure.

Various embodiments of the present disclosure may be implemented by computer program executable by one or more of the processors 911, 921, and 931, software, firmware, hardware or in a combination thereof.

The MEMS 912, 922 and 932 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 911, 921 and 931 may be of any type suitable to the local technical environment, and may include one or more of general purpose computers, special purpose computers, microprocessors, digital signal processors DSPs and processors based on multicore processor architecture, as non-limiting examples.

Although some embodiments are described in the context of an exemplary network shown in FIG. 1, it should not be construed as limiting the spirit and scope of the present disclosure. The principle and concept of the present disclosure may be more generally applicable to other network architectures supporting Selective UP Activation and Deactivation.

Some embodiments may have the following advantage. All the sessions, the specified type of session(s), or the session(s) towards the specified data network name of the UE may be activated by the first NF based on corresponding, therefore the user experience and/or quality of service for these sessions may be improved.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:

1. A method implemented at a primary Network-Function Repository Function (NRF) in a communication network, the method comprising:
receiving a discovery request from a first secondary NRF, the discovery request including a service query information for a target Network Function (NF);
obtaining target NF information;
providing the target NF information to the first secondary NRF;
receiving registration information from one or more secondary NRFs, the obtaining target NF information being based on the registration information;
maintaining a routing table for mapping the information of the secondary NRFs and the information of NFs that are registered in the corresponding NRF; and
updating the routing table based on the registration information.

2. The method of claim 1, wherein obtaining target NF information comprises:
sending the discovery request to at least one of other secondary NRFs; and
receiving a response from at least one of other secondary NRFs, the response including an indication of whether the other secondary NRFs contains the target NF information; and
if the indication represents that the other secondary NRF contains the target NF information, the response further includes the target NF information, the information of the other secondary NRF, or both.

3. The method of claim 2, wherein sending the discovery request to at least one of other secondary NRFs comprises:
broadcasting the discovery request to other secondary NRFs.

4. The method of claim 2, wherein sending the discovery request to at least one of other secondary NRFs comprises:
selecting one or more NRFs from the other secondary NRFs based on the service query information; and
multicasting the discovery request to one or more NRFs selected.

5. The method of claim 2, further comprising:
maintaining routing table information for mapping the service query information and the target NF information and/or the information of the other secondary NRF.

6. The method of claim 5, wherein maintaining the routing table information comprises:
updating the routing table information based on the response from at least one of other secondary NRFs.

7. The method of claim 6, further comprising:
sending the routing table information to at least one of the secondary NRFs.

8. The method of claim 5, wherein sending the discovery request to at least one of other secondary NRFs comprises:
selecting one or more NRFs from the other secondary NRFs based on the service query information and/or the routing table information; and
multicasting the discovery request to one or more NRFs selected.

9. The method of claim 5, wherein information of the other secondary NRF includes the address of the other secondary NRF.

10. The method of claim 9, wherein the address of the NRF comprises at least one of the following parameters:
FQDN, IP address, URL.

11. The method of claim 1, further comprising:
sending the discovery request to at least one of other secondary NRFs, the sending the discovery request to at least one of other secondary NRFs including:
selecting one or more NRFs from the other secondary NRFs based on the routing table; and
sending the discovery request to one or more NRFFs selected.

12. The method of claim 1, wherein
the service query information comprises at least one of the following parameters:
NF type, service name, NF instance ID, PLMN ID, FQDN, DNN, SUPI, GPSI, ECGi, NCGI, Region Identity, S-NSSAI, IP address, Data set ID, routing ID of SUCI,
the discovery request includes at least one of the following:
one of service requests of Nnrf NFManagement service, one of service requests of Nnrf NFDiscovery, or one of service requests of OAuth2 Authorization Service, and
the target NF information includes at least part of the NF profile of the target NF.

13. The method of claim 1, wherein the registration information comprises at least part of the NF profile of the secondary NRF, wherein the NF profile of the secondary NRF comprises:
NRFs profile and NRF specific information;
the NRFs profile including at least part of the following information of the NRF: NF instance ID, NF type, service name, PLMN ID, FQDN, S-NSSAI, NSI, IP address, region ID, ECGi, NCGI, TAI, DNN, group ID, SUPI ranges, GPSI ranges, external Group Identifiers Ranges; Data set ID; routing ID of SUCI; and
the NRF specific information including at least part of the information of the NFs that are registered in the secondary NRF.

14. A method implemented at a secondary Network-Function Repository Function (NRF) in a communication network, the method comprising:
receiving a discovery request from a first Network Function (NF), the discovery request including a service query information for a target NF;
obtaining target NF information; and
providing the target NF information of the first NF;
receiving register request from the NF, wherein the register request comprises NF profile of the NF;
updating NF profile of the secondary NRF; and
sending registration information to the primary NRF, the registration information including a record for mapping the information of the secondary NRF and the information of NF that is registered in the secondary NRF.

15. The method of claim 14, further comprising:
determining if the secondary NRF contains the target NF based on the service query information;
if the secondary NRF contains the target NF, sending the target NF information to the first NF; and
if the secondary NRF doesn't contain the target NF, forwarding the discovery request to the primary NRF.

16. The method of claim 14, further comprising:
storing the record that mapping the service query information and the target NF information.

17. The method of claim 14, wherein the registration information comprises at least part of the NF profile of the secondary NRF, wherein the NF profile of the secondary NRF comprises:

NRF's profile and NRF specific information;

the NRF's profile including at least part of the following information of the NRF: NF instance ID, NF type, service name, PLMN ID, FQDN, S-NSSAI, NSI, IP address, region ID, ECGi, NCGI, TAI, DNN, group ID, SUPI ranges, GPSI ranges, external Group Identifiers Ranges; Data set ID; routing ID of SUCI; and the NRF specific information including at least part of the information of the NF's that are registered in the secondary NRF.

18. An apparatus implemented at a primary Network-Function Repository Function (NRF), comprising:

a processor; and a memory coupled to the processor, said memory containing instructions executable by the processor, the apparatus being operative to:

receive a discovery request from a first secondary NRF, the discovery request comprise including a service query information for a target Network Function (NF);

obtain target NF information;

provide the target NF information to the first secondary NRF;

receive registration information from one or more secondary NRFs, the obtaining target NF information being based on the registration information;

maintain a routing table for mapping the information of the secondary NRFs and the information of NFs that are registered in the corresponding NRF; and update the routing table based on the registration information.

\* \* \* \* \*